Oct. 10, 1967 L. R. SAGAR 3,346,197
METHOD FOR GRANULATING MATERIAL OF PLASTIC
CONSISTENCY AND SYSTEM THEREFOR
Filed Jan. 8, 1965 2 Sheets-Sheet 1
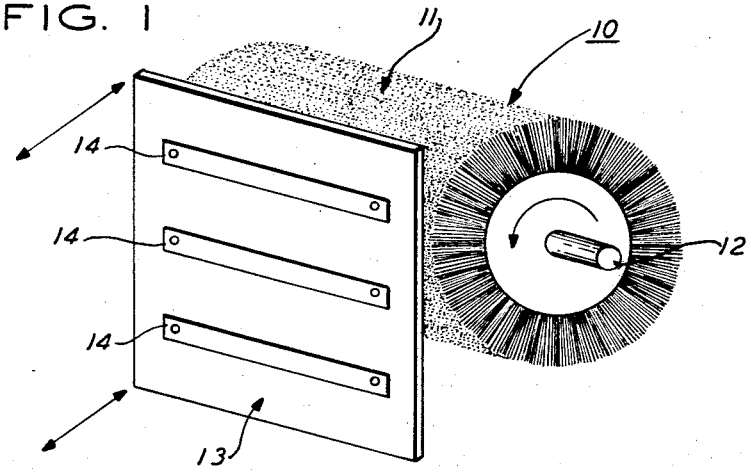
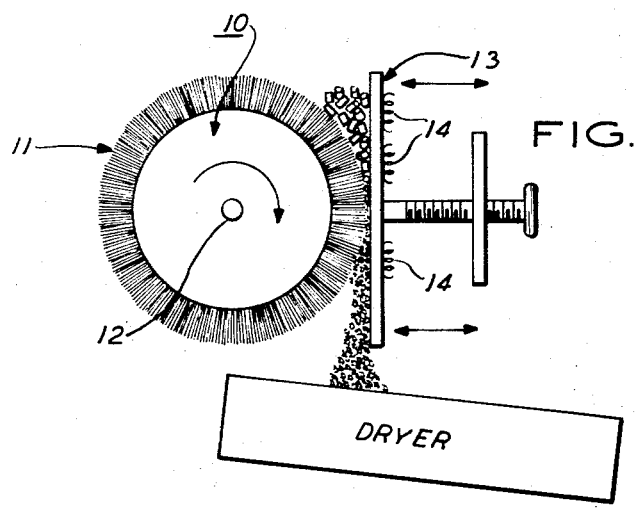
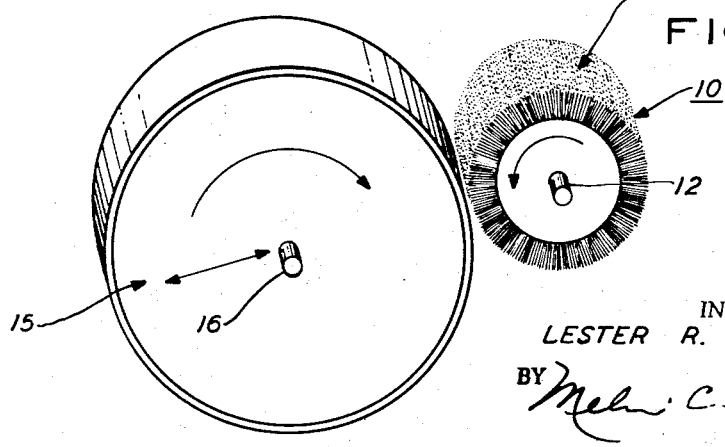
INVENTOR.
LESTER R. SAGAR
BY
ATTORNEY Oct. 10, 1967 L. R. SAGAR 3,346,197
METHOD FOR GRANULATING MATERIAL OF PLASTIC
CONSISTENCY AND SYSTEM THEREFOR
Filed Jan. 8, 1965 2 Sheets-Sheet 2
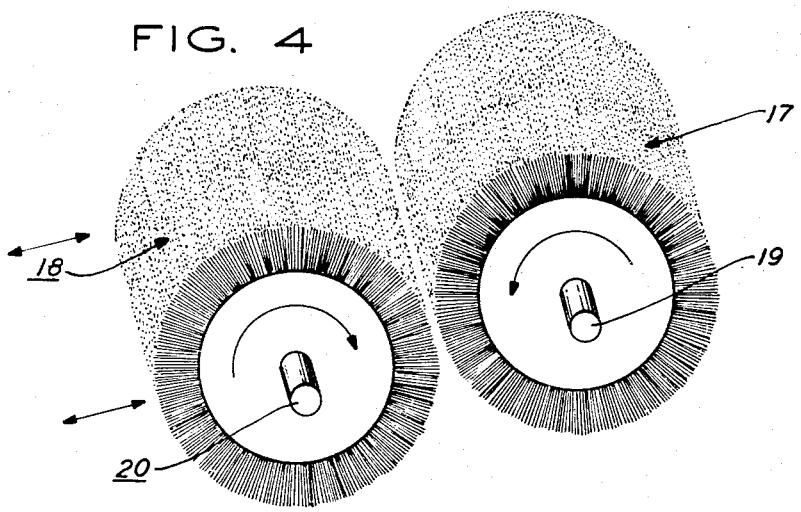
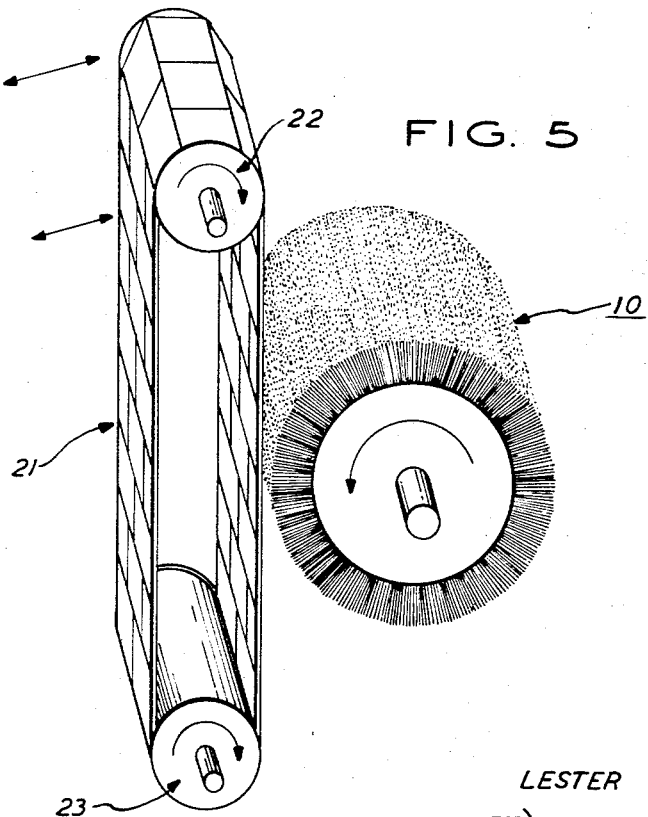
INVENTOR.
LESTER R. SAGAR
BY
ATTORNEY

United States Patent Office 3,346,197
Patented Oct. 10, 1967

3,346,197
METHOD FOR GRANULATING MATERIAL OF PLASTIC CONSISTENCY AND SYSTEM THEREFOR
Lester R. Sagar, Tallahassee, Fla., assignor to Minerals & Chemicals Philipp Corporation, Woodbridge, N.J., a corporation of Maryland
Filed Jan. 8, 1965, Ser. No. 424,285
15 Claims. (Cl. 241—23)

ABSTRACT OF THE DISCLOSURE

Lumps of a plastic material, such as extruded pellets of moist clay, are granulated to form particles, the size of which lies within a predetermined narrow mesh-size range, by feeding the plastic lumps between the gap formed between radial bristles of a brush rotating around the axis of the brush and a relatively fixed element such as a plate spaced a short distance from the bristles. The bristles penetrate the plastic particles as the particles are momentarily held between the bristles and the fixed element. As the brush rotates, the impaled lumps are subdivided into a multiplicity of smaller particles which are discharged from the rapidly rotating brush by centrifugal force. By granulating the particles in this manner fewer fines and less oversize granules are produced than when materials are granulated by conventional means in which the material is in nonplastic friable condition during the granulation step.

This invention relates to a method and system for granulating clay or clay-like material and is directed, especially to the granulation of solid material which is in a moist, plastic state or condition.

Clays and many other finely divided materials have plastic properties when moist. Such materials are frequently granulated into mesh size particles for the purpose, for example, of producing adsorbents, catalysts, carrier material for insecticides, herbicides, floor cleaners, etc. It is conventional to granulate clays or the like by moistening the finely divided material until it has a plastic and extrudable consistency, extruding the moist plastic material to form strands which are cut into pellets of suitable length. Sufficient water is then removed from the plastic pellets by a drying step to permit the extruded pellets to be ground. The grinding is usually carried out in a hammer mill or roller mill, following which the ground material is screened to recover fractions of the desired mesh size. Sometimes the extrusion step is omitted and crushed raw clay or the like is dried, ground and screened. From this brief description of conventional granulation processes, it can be seen that a characteristic is that the actual subdivision of the mill feed takes place when the material is relatively dry and nonplastic. Under such a condition, grinding inherently produces an appreciable amount of powder or fines (e.g., minus 60 mesh particles). This is usually very undesirable since in most cases the fines have very limited use as compared to coarser granules of the clay, especially the plus 8 mesh granules. In effect, a useless or comparatively useless material is produced simultaneously with the desired mesh size granular material. Another undesirable characteristic of the prior art granulation technique is that the pelleted or lump material charged to the drying equipment is very large as compared to the granular material subsequently obtained by milling the pellets or lumps. Obviously, the heat transfer would be appreciably more efficient and uniform, and better drying rates could be achieved, if it were possible to dry the clay or clay-like material after the granulation step instead of before granulation as in the prior art method.

Accordingly, a general object of this invention is to provide a method for granulating clay or clay-like mineral material having plastic properties, wherein the actual granulation occurs while the solid to be granulated is moist and plastic.

A specific object of this invention is to granulate plastic clay or the like by means of a simple assembly including a rotating brush.

Another object is to provide rotary brush assemblies for granulating plastic mineral masses on a continuous basis.

Still another object is to granulate plastic mineral masses in a manner such that a substantial amount of the granulated material has a particle size lying within a predetermined limited mesh-size range.

Further objects and features of this invention will be apparent from the description thereof which follows, taken with the accompanying drawings in which:

FIGURE 1 is a diagrammatic perspective view of a presently preferred form of a brush system, in accordance with this invention, for granulating clay or the like;

FIGURE 2 is a diagrammatic view, partially in section, of the system represented in FIGURE 1, illustrating its mode of operation;

FIGURES 3, 4 and 5 are perspective views of other brush systems, also in accordance with this invention, for granulating plastic material.

I have discovered a simple, yet highly efficient and practical method for granulating plastic masses such as clay. Stated briefly, this method comprises piercing or impaling moist plastic lumps of the solid to be granulated on bristles of a rotating brush by feeding the lumps between the gap formed between radial bristles of a rotating brush and a fixed abutment spaced a short distance from the outer periphery of the bristles, and rotating the bristles with impaled lumps rapidly so as to disengage the impaled lumps from the bristles by centrifugal force. Preferably, the lumps are uniformly sized and shaped masses, such as extruded pellets. The penetration of the bristles into the lumps to an extent determined by the bristle density (number of bristles per unit area) and to a depth controlled by the size of the gap between the surface of the bristles and the fixed abutment, followed by the rapid removal of the impaled lumps from the bristles, in accordance with my process, results in a controlled subdivision of the lumps while the solid is still plastic. The grade size of the resulting subdivided material is readily controlled and depends principally on the dimension of the gap between the bristles and the fixed abutment, the brush density and the peripheral speed of the brush. Thus, the finer granules in the product are obtained from the portion of the charge lumps into which the brush wires or bristles penetrate, resulting in the subdivision of that portion of the lumps into a multiplicity of smaller particles. The dimension of these finer granules is obviously established by the number of bristles present per unit area of brush surface. The coarser granules in the product are obtained from the portion of the lumps into which the bristles do not penetrate. This is the portion of the lumps that is momentarily held between the fixed abutment and the outer periphery of the bristles while the bristles penetrate the remainder of the lumps. The dimension of these relatively coarse granules is controlled or established primarily by control of the width of the gap between the brush and the abutment.

After granulation, as described hereinabove, the plastic granules can be dried at least to the extent that they are no longer plastic and then can be screened to separate out fractions each containing granules falling largely within desired limited mesh-size ranges. Alternatively, the granules can be classified before drying. In the later case, classification equipment capable of operating with plastic material must be used. With some granules the product can be used without a drying step or with a very mild drying step.

An obvious advantage of my process is that the granulation occurs while the solid is still moist and plastic. Little, if any, undesirable fines are produced under such conditions. Thus, much larger yields of granular products of desired mesh size are achieved.

Another advantage of granulating the charge material while it is in plastic condition is that the resulting granules can be rounded, as by tumbling, before drying to produce rounded granules. Round granules are frequently more desirable than angular granules of similar size. Another important advantage is that the drying operation is more efficient when the dryer is charged with mesh-size granules rather than a relatively coarse extrudate, as in present practice. More specifically, with a granular material, it is easier to control the drying operation then when coarse extrudate is used. More uniform drying is achieved; less fuel is consumed per unit weight of material dried; and increased drying rates and throughputs can be employed.

The apparatus for granulating moist plastic mineral masses, in accordance with the present invention, generally comprises: a cylindrical brush in which the bristles extend radially; plate means in close proximity to, but spaced from the outer periphery of the bristles a fixed adjustable distance, for momentarily holding lumps of plastic clay or the like as the lumps are engaged and penetrated by the bristles; means for charging plastic lump feed material into the gap formed between the brush and the plate; and means for rotating the brush at high speed relative to the plate means and in a direction toward the plate so as to cause lumps impaled by the bristles to be disengaged therefrom by centrifugal action. Preferably, means is also provided for preventing the plastic clay from sticking to the plate. A heater associated with the plate can be used for the purpose. The plastic lumps of the material to be granulated are fed vertically into the angle between the rotating brush and the plate means. Hopper means or the like are provided below the brush and the plate for receiving the green plastic granules.

My process differs fundamentally from the processes of U.S. 2,481,326 to W. J. Miller and of U.S. 3,150,835 to N. Horton, both of which entail the use of rotating brushes with plastic clay. In carrying out the process of the Miller patent, a rotating brush is used as a device to pelletize clay by cutting strands of clay into pellets as the strands issue through a screen. To accomplish this result, the brush merely shears the clay strands as they issue from an arcuate screen. Similarly, in the Horton process, the brush merely abrades clay strands as the strands issue from an extruder. In my process, in contrast, the brush must pierce or impale preformed clay pellets or lumps that are fed into the bite between the brush and a breaker plate. The resulting controlled penetration of bristles into pellets to subdivide the pellets into granules of approximate grade size or sizes is fundamentally different from the mere tearing or shredding of clay strands by a simple shearing action as taught by Miller and Horton. Similarly, the apparatus of the present invention differs fundamentally from those of Miller or Horton. An essential feature of the granulating apparatus of this invention is that the brush is spaced in controlled proximity to relatively fixed element for momentarily holding clay lumps or pellets. The latter element is not present in the prior art devices. Another important difference is that my apparatus is provided with means, such as a feed hopper, to feed material vertically between the angle formed by the brush and the plate. In the apparatus of Miller or Horton, the material is fed towards the brush, not vertically between the brush and a relatively fixed element against which the brush rotates. Still another distinguishing feature is that in my apparatus the element against which the brush rotates is provided with means, such as heating coils, to prevent sticking of plastic material.

My invention will be better understood by a reading of the following detailed description thereof.

The brush granulator of FIGURES 1 and 2 features a horizontal cylindrical brush 10, having radial bristles 11. Brush 10 is adapted to rotate on shaft 12 at high speed by an eletcric motor (not shown) and is spaced a short distance from a heated vertical breaker plate 13. The breaker plate 13 is adjustable in a horizontal direction by any suitable means so as to vary the size of the gap formed between the brush 10 and plate 13. This can be done by mounting the vertical plate on rolls adapted to slide in stationary horizontal framed members and providing the plate with a threaded bolt and handle which permit the plate to slide backward or forward in the frame members in response to turning of the handle. The brush is driven by a suitable drive means (not shown) in a direction toward plate 13 at a peripheral velocity typically within the range of 75 to 175 feet per second. Heat is applied to the breaker plate 13 by electrical heaters, or other suitable devices placed at various strategic locations on the plate, such as indicated by 14, where moist clay tends to build-up and accumulate.

FIGURE 3 shows a variation of the brush granulator of FIGURES 1 and 2 which features a cylindrical rotating breaker 15 to remove the clay from the brush and prevent build-up of clay on the brush. The cylindrical rotating breaker plate 15 has a larger diameter than brush 10 and rotates about shaft 16 at a slow speed as compared to the speed of brush 10 and in a direction opposite to the direction of rotation of brush 10. Means is provided to adjust the distance between shafts 12 and 16 so as to control the gap formed between the cylindrical breaker plate 16 and the bristles of brush 10. As a modification, heat can be applied to the inside and/or outside of plate 15.

In the embodiment illustrated in FIGURE 4, two identical cylindrical brushes, 17 and 18, rotate about shafts 19 and 20, respectively, a small distance from each other and at different rates of speed. The gap between these brushes is adjustable for particle size control by varying the distance between shafts 19 and 20.

In the embodiment illustrated in FIGURE 5, a breaker plate 21 is constructed of small steel plates jointed togther to form a continuous vertical belt that is actuated by rolls 22 and 23 which are driven in the direction illustrated. The rotating brush 10 rotates at high speed relative to the speed of rolls 22 and 23 and in a direction towards the slowly moving belt which continuously scrapes clay from the bristles. This belt can be heated. Means is provided to adjust the distance between the plate 21 and brush 10.

In putting the present invention into practice, I prefer to employ plastic lumps which are uniform in size and shape, as well as being very uniform in moisture content. Such uniformity in the charge contributes to the realization of uniform and predictable granulation. In order to impart the desired uniformity to the charge, it is preferable to mix or pug the charge thoroughly with water (when water is needed to plasticize the material) and then extrude the pugged plastic material to form strands which must be cut into pellets before being charged to the brush granulator. Pellets obtained by forming means other than extrusion can be used. Recommended is the use of substantially uniformly sized pellets having a diameter lying within the range of from about $\frac{4}{10}''$ to about $\frac{5}{8}''$ and a length within the range of about $\frac{1}{2}''$ to about $2''$. The moisture content of the charge will vary, of course, with the properties of the mass being granulated and, as mentioned, should be uniform throughout the charge. In the case of raw attapulgite clay, a plastic material which gives noteworthy results in my process, extruded pellets of consistency suitable for brush granulation contain a quantity of water such that the volatile matter (V.M.) content of the pellets lies within the range of 48% to 58%, and is preferably about 50% to 52%. Volatile matter is the weight percent of a material that is eliminated when the material is heated to essentially constant weight at 1800° F. (In the case of raw attapulgite clay, water accounts for substantially all of the volatile matter.) When the volatile matter content of the charge is too low, the charge will not have the required uniform plastic consistency and fines will be formed during granulation. On the other hand, when too much water is present the system will be too fluid to be granulated by the brush granulator.

My invention is especially applicable to the granulation of clays which have a plastic consistency when moistened to a suitable water content. Various clays can be employed, as exemplified by koalin clays, including ceramic-type clays, montmorillonites (including bentonites) and the attapulgite-type clays, including sepiolite and attapulgite. The invention, however, is not limited to the processing of clays since other finely divided (e.g., minus 200 mesh) solids having plastic properties can be used. Thus, the operativeness of my process requires the use of a material that has a plastic consistency and the particular chemical composition of that material is not of the essence. For example, finely divided bauxite can be used in my process provided it is in the required form of plastic lumps. With the bauxite, a small amount of sodium hydroxide or other agent will usually have to be employed with the finely divided ore to impart the required plasticity. Similarly, the process can be used to granulate finely divided solids plasticized with various aqueous solutions, e.g., clay or clay mixture can be plasticized with alkali or acid solutions. The resulting granules can be variously processed to obtain useful products, such as adsorbents or catalysts, in granular form. It is also within the scope of the invention to granulate plastic masses comprising a mixture of finely divided (minus 200 mesh) solid material and clay in amount sufficient to bind the solid material. As examples of such finely divided solid material may be mentioned insoluble herbicides, pesticides, fertilizer ingredients, zeolites, active catalytic material or the precursor of an active catalytic material. In carrying out such form of my invention, the finely divided solid can be blended with the clay binder, the mixture moistened to a plastic consistency, extruded into pellets, and the undried pellets fed to the brush granulator and then dried.

In a plant scale operation of my process, raw attapulgite clay from a deposit near Attapulgus, Ga. (about 50% V.M.), was pugged without addition of water. The plastic mix was extruded in an auger extruder through a die plate having a thickness of about ½″ and ¼″ holes, producing pellets about ¼″ to ½″ long. The extruded pellets, having a volatile matter content of about 49%, were charged to a brush granulator system of the type shown in FIGURES 1 and 2. The cylindrical brush, which had an overall diameter of 15″ and was 23⅝″ long, was covered by radial bristles, each of 0.014″ steel wire and 1½″ in length. The brush was formed by keying 39 sections of commercial cylindrical brushes on an arbor. The vertical breaker plate, which was about 25″ long and about 25″ wide, was provided with three 1500 watt electric heating units, each spaced from each other and secured horizontally to the back face of the plate with one unit being placed at a location slightly above the top of the brush, another adjacent the midpoint of the brush and another adjacent the base of the brush. Rollers were secured on the upper corners of the vertical breaker plate and the plate was mounted in a horizontal framework in a manner such that the plate could slide forwards and backwards in the framework to control the size of the gap between the brush and the front face of the breaker plate. To control the sliding movement of the plate towards and away from the brush, a threaded bolt was secured to the rear of the plate at its midpoint and a handle was threaded to the bolt. With the gap between brush and breaker plate maintained at ⅛″ and the 15″ brush driven at 2250 r.p.m. (150 ft./sec.) by a 20 H.P. variable speed motor, the pellets were charged to the mill at the rate of 32 tons per hour. This was about a 100% increase over the normal production rate in which the plastic clay extrudate was dried and then ground in a hammer mill. The granular material which was discharged from the brush granulator was charged to a continuous externally fired drum dryer at a rate of about 10.5 tons per hour and dried to a volatile matter content of about 17%. The gas consumption of fuel was measured and from this figure and the dryer feed rate, a gas efficiency of 1856 cu. ft. per ton of feed was calculated. This represented a decrease in fuel consumption of about 15% over an operation in which the same dryer was charged with extruded pellets and the pellets dried to a similar volatile matter content at a similar throughput rate.

Runs were made with the gap between the brush and the breaker plate adjusted to distances ranging from about 1/16″ to ⅛″ and the brush operated at various speeds. The plastic clay granules were dried in the rotary dryer to a V.M of about 17% and screened to determine the particle size distribution of the products. The results were summarized in the accompanying table.

SCREEN ANALYSES OF BRUSH GRANULATED CLAY

| | Gap Setting* | | | | | |
|---|---|---|---|---|---|---|
| | 1½ | 1½ | 1 | ½ | ⅓ | ⅔ |
| | Brush Speed, r.p.m. | | | | | |
| | 1,300 | 1,700 | 1,700 | 1,300 | 1,700 | 2,250 |
| | Weight Percent | | | | | |
| Mesh: | | | | | | |
| +6 | 24.2 | 13.3 | 4.7 | 9.0 | 2.9 | 8.1 |
| 6/8 | 25.7 | 17.7 | 9.7 | 11.3 | 4.2 | 9.8 |
| 8/10 | 22.3 | 21.3 | 21.7 | 18.2 | 13.6 | 17.0 |
| 10/12 | 7.5 | 9.1 | 11.7 | 10.5 | 10.9 | 10.0 |
| 12/14 | 5.5 | 7.8 | 10.2 | 9.8 | 11.2 | 9.8 |
| 14/16 | 4.0 | 6.6 | 10.3 | 9.3 | 11.2 | 9.8 |
| 16/20 | 3.3 | 6.0 | 7.3 | 9.4 | 12.0 | 8.4 |
| 20/24 | 2.0 | 4.0 | 6.1 | 4.6 | 6.0 | 5.6 |
| 24/28 | 1.5 | 3.3 | 5.0 | 4.8 | 6.5 | 5.1 |
| 28/32 | 1.2 | 2.9 | 4.3 | 4.4 | 6.4 | 4.0 |
| 32/35 | 0.8 | 1.9 | 2.3 | 2.3 | 5.5 | 3.8 |
| 35/42 | 0.6 | 1.7 | 2.0 | 1.8 | 2.8 | 2.7 |
| 42/48 | 0.5 | 1.2 | 1.8 | 1.6 | 2.7 | 2.0 |
| 48/60 | 0.3 | 1.0 | 1.3 | 1.5 | 3.0 | 1.5 |
| −60 | 0.5 | 2.1 | 1.7 | 1.5 | 3.0 | 2.4 |

*Gap 1=1/12″.

The data show that in all runs the product contained granules largely within very limited mesh-size ranges. Also shown by the data is that granule size was decreased by increasing brush speed and/or reducing the size of the gap between the brush and the plate. The data show also that except with the larger gap settings, undesirable minus 60 mesh undersize could be maintained below 3% and undesirable oversize could be maintained below 10%.

All mesh-size values used herein refer to values as determined with Tyler sieves. All quantities are reported on a weight basis.

The term "plastic" as used herein refers to the characteristic of being essentially permanently deformable in any direction without rupture by an externally applied force of a value in excess of the yield point of the composition. The term "impaling" is used in the usual sense of piercing or penetrating.

I claim:

1. A method for granulating moist, plastic finely divided solid material which comprises impaling coherent moist lumps of said material on bristles while the lumps are momentarily held between the bristles and a fixed element and rotating the bristles with impaled lumps at a speed sufficient to disengage the impaled lumps from the bristles, whereby the lumps are broken up into a multiplicity of granules.

2. A method for continuously granulating lumps of moist, plastic finely divided solid material which comprises continuously feeding said lumps between the gap formed by a rotating element provided with radial bristles and a solid surface spaced a fixed distance from the rotating element, rotating said element with bristles at high speed relative to said solid surface and in a direction towards said surface, whereby said lumps are pierced by bristles and then disengaged from the bristles as the lumps pass through said gap.

3. A method for producing nonplastic granules from moist, plastic finely divided mineral matter which comprises extruding said material into uniformly sized pellets, while the pellets are still moist and plastic, charging them between the gap formed by a cylindrical rotating roll provided with radially extending bristles and a solid surface spaced a fixed distance from the rotating element, rotating said roll at high speed relative to said surface, whereby the pellets are impaled on the bristles as they pass through the gap and are then disengaged centrifugally from the bristles, thereby forming a multiplicity of granules, and drying the granules.

4. A method for continuously granulating lumps of moist, plastic clay which comprises continuously feeding said lumps between the gap formed by a cylindrical rotating element provided with radial bristles and a solid surface spaced a fixed distance from said outer periphery of said bristles, and rotating said element with bristles at high speed relative to said solid surface and in a direction towards said surface, whereby said lumps are pierced by bristles and then disengaged centrifugally from the bristles as the lumps pass through said gap.

5. A method for granulating moist, plastic naturally occurring attapulgite clay which comprises impaling coherent moist lumps of said material on rotating radial bristles while the lumps are momentarily held between the bristles and a fixed element to which the lumps do not stick, and rotating the bristles with impaled lumps at a speed sufficient to disengage the impaled lumps from the bristles, whereby the lumps are broken up into a multiplicity of granules.

6. A method for granulating moist, plastic naturally occurring attapulgite clay which comprises continuously feeding moist lumps of said material between the gap formed by a rotating element provided with radial bristles and a solid surface spaced a small fixed distance from the outer extremity of said bristles while rotating said element with bristles at high speed relative to said solid surface and in a direction towards said surface, whereby said lumps are pierced by bristles and then disengaged centrifugally from the bristles as the lumps pass through said gap.

7. A method for granulating moist, plastic naturally occurring attapulgite clay which comprises extruding said material into pellets, while the pellets are still moist and plastic, charging them vertically between the gap formed by a cylindrical rotating roll provided with radially extending bristles and a solid surface spaced a small and adjustable distance from the outer extremity of said bristles, rotating said roll at high speed relative to said surface, whereby the extrudate is impaled on the bristles and disengaged centrifugally therefrom after passing through said gap, thereby forming a multiplicity of granules of predictable mesh size.

8. A method for continuously granulating moist, plastic finely divided solid material which comprises providing said material in the form of uniform lumps each about $4/10''$ to about $5/8''$ in diameter, continuously feeding said lumps between the gap formed by a cylindrical rotating element provided with radial bristles and a stationary solid surface spaced a distance within the range of about $1/16''$ to about $1/8''$ from the outer extremity of said bristles, and rotating said element with bristles at high speed relative to said solid surface and in a direction towards said surface, whereby said lumps are pierced by bristles and then disengaged centrifugally from the bristles as the lumps pass through said gap.

9. A method for granulating moist, plastic finely divided mineral matter which comprises providing said material in the form of extruded pellets each about $4/10''$ to about $5/8''$ in diameter and within the range of about $1/2''$ to about $2''$ long, while the pellets are still moist and plastic, charging them between the gap formed by a cylindrical rotating roll provided with radially extending bristles and a solid surface spaced a constant distance within the range of about $1/16''$ to about $1/8''$ from the outer extremity of said bristles, rotating said roll at high speed relative to said surface, whereby the extrudate is impaled on the bristles and disengaged centrifugally after contact with said solid surface, thereby forming a multiplicity of granules, and drying the granules.

10. The method of claim 9 in which said mineral matter comprises plastic clay.

11. A method for granulating moist, plastic naturally occurring attapulgite clay which comprises extruding said material into uniform pellets having a diameter within the range of about $4/10''$ and about $5/8''$ and a length within the range of about $1/2''$ to about $2''$, while the pellets are still moist and plastic, charging them vertically between the gap formed by a cylindrical rotating roll provided with radially extending bristles and an abutment spaced a constant distance within the range of about $1/16''$ to about $1/8''$, rotating said roll at high speed relative to said abutment, whereby the extrudate is impaled on the bristles and disengaged centrifugally therefrom after contact with said abutment, thereby forming a multiplicity of granules, and drying the granules.

12. A system suitable for granulating moist, plastic clay and comprising a cylinder provided with a multiplicity of radial bristles for impaling moist clay lumps, means for rotating said cylinder at high speed, solid vertical plate means adjacent said cylinder and spaced a small distance from the outer periphery of said bristles for engaging clay lumps while they are being impaled on said brushes, and means for adjusting the space between said means for engaging lumps and the outer periphery of said bristles for controlling the size of the granules obtained from said lumps.

13. The system of claim 12 in which said vertical plate is provided with heating means for preventing plastic material from sticking thereto.

14. A system for granulating moist clay lumps on a continuous basis which comprises:
a horizontal drum, the peripheral surface of which is uniformly provided with a multiplicity of uniform metal bristles which protrude radially therefrom, a vertical plate spaced from the outer extremity of said bristles, means for adjusting the distance between said bristles and said plate to an amount ranging from about $1/16''$ to about $1/8''$, means for heating said plate and means for rotating said drum about the horizontal axis of said drum at high speed and in a direction towards said plate.

15. A system suitable for granulating moist, plastic clay and comprising a cylinder provided with a multiplicity of radial bristles for impaling moist clay lumps, means for rotating said cylinder at high speed, a second cylinder provided with a multiplicity of radial bristles adjacent said first-mentioned cylinder and spaced a small distance from the outer periphery of bristles of said first-mentioned cylinder for engaging clay lumps while they are being impaled on bristles of said first-mentioned cylinder, means for rotating said second-mentioned cylinder at low speed as compared to the speed of said first-mentioned cylinder, and means for adjusting the space between the outer periphery of bristles of said first-mentioned cylinder and the outer periphery of bristles of said second-mentioned cylinder for controlling the size of the granules.

References Cited

UNITED STATES PATENTS

| | | | |
|---|---|---|---|
| Re. 13,519 | 1/1913 | Bilz | 241—221 X |
| 534,247 | 2/1895 | Beamer | 146—299 X |
| 1,027,163 | 5/1912 | Werner | 241—102 X |
| 1,691,196 | 11/1928 | Jirotka | 241—242 X |
| 2,684,206 | 7/1954 | Zettel | 241—235 X |
| 3,150,835 | 9/1964 | Horton | 241—16 |

ANDREW R. JUHASZ, *Primary Examiner.*